United States Patent [19]

Panek et al.

[11] 4,312,775

[45] Jan. 26, 1982

[54] POLYETHER THICKENERS FOR AQUEOUS SYSTEMS CONTAINING ADDITIVES FOR INCREASED THICKENING EFFICIENCY

[75] Inventors: Edward J. Panek, Trenton; Pauls Davis, Gibraltar, both of Mich.

[73] Assignee: BASF Wyandotte Corporation, Wyandotte, Mich.

[21] Appl. No.: 86,839

[22] Filed: Oct. 22, 1979

[51] Int. Cl.$^3$ .............................................. B01J 13/00
[52] U.S. Cl. .................................. 252/316; 252/78.5; 568/624
[58] Field of Search .................. 252/316, 78.5, 174.16, 252/DIG. 17

[56] References Cited

U.S. PATENT DOCUMENTS

| | | | |
|---|---|---|---|
| 2,425,755 | 8/1947 | Roberts et al. | 560/625 |
| 2,674,619 | 4/1954 | Lundsted | 560/198 |
| 3,101,301 | 8/1963 | Siegal et al. | 252/316 X |
| 3,427,382 | 2/1969 | Haefele | 252/316 X |
| 3,475,499 | 10/1969 | Wimmick | 568/680 |
| 3,535,307 | 10/1970 | Moss et al. | 536/4 |
| 3,538,033 | 11/1970 | Hayashi et al. | 260/29.2 EP |
| 3,748,276 | 7/1973 | Schmolka | 252/316 |
| 3,829,506 | 8/1974 | Schmolka et al. | 568/624 |

*Primary Examiner*—Richard D. Lovering
*Attorney, Agent, or Firm*—Andrew E. Pierce

[57] ABSTRACT

Polyether-based thickeners for aqueous systems having molecular weights of about 1000 to about 75,000 which are modified with alpha-olefin epoxides having about 12 to about 18 carbon atoms exhibit increased thickening efficiency in the presence of certain organic additives. These are ethoxylated phosphate esters or mixtures of said esters with water-soluble amines. The polyethers contain about 1 to about 20 percent by weight based upon the weight of the polyether of an alpha-olefin oxide. Polyether-based thickeners containing at least one of an ethoxylated phosphate ester, or said ester in admixture with a water-soluble amine, processes for the preparation of thickened aqueous systems, and thickened aqueous compositions are disclosed. The polyether-based thickeners of the invention are particularly useful for thickening water or water-glycol mixtures which are useful as hydraulic fluids.

21 Claims, No Drawings

POLYETHER THICKENERS FOR AQUEOUS SYSTEMS CONTAINING ADDITIVES FOR INCREASED THICKENING EFFICIENCY

BACKGROUND OF THE INVENTION

1. Field of the Invention

This invention relates to thickeners for aqueous systems based upon polyethers of high molecular weight.

2. Prior Art

Polymeric water-soluble thickening agents are widely used for many purposes. Commercially available polymeric thickeners differ widely in chemical composition. The diversity of available thickening agents is an indication that not all are equally useful. It is not unusual to find some thickening agents which perform well in a certain environment and not at all in another environment. In fact, in some uses, no one thickening agent is completely satisfactory and there is a continual need and a continuing search for new thickening agents to satisfy many unmet needs. For instance, various cellulose derivatives or other water-soluble polymers such as sodium polyacrylates, polyacrylamides and polyethylene glycol fatty acid diesters are representative thickening agents. The polyethylene glycol fatty acid diesters are widely used for textile printing emulsions, cosmetic emulsions, and aqueous pigment suspensions. These esters suffer from the defect that they are not resistant to hydrolysis in an acid or alkaline medium so that under such conditions the thickening effect initially obtained is gradually reduced.

Polyoxyalkylene compounds, including high molecular weight materials are well known for use as surface-active agents, as disclosed in U.S. Pat. No. 2,674,619. These compositions can be prepared at high molecular weights, for instance, up to 25,000 for use as aqueous thickeners. It is known that liquid polyoxyalkylenes can be obtained by utilizing a mixture of ethylene oxide and another lower alkylene oxide in an oxide ratio of from 75 to 90 percent ethylene oxide to 10 to 25 percent other lower alkylene oxides such as 1,2-propylene oxide, as taught in U.S. Pat. No. 2,425,755. The polyethers of the prior art having high thickening efficiency are generally those having the highest molecular weights reasonably obtainable under commercial conditions with price considerations being a limiting factor. Because the preparation of high molecular weight polyethers require a disproportionately longer processing time to produce, it would be desirable to prepare high efficiency thickeners utilizing lower molecular weight polymers.

In U.S. Pat. No. 3,538,033, there are disclosed polyoxyalkylene derivatives of diepoxides having thickening properties. The thickener compositions disclosed are useful for thickening aqueous systems and are prepared by reacting a diepoxide compound having at least 12 carbon atoms with an alkylene oxide adduct containing from 100 to 250 moles of ethylene oxide units.

In U.S. Pat. No. 3,829,506, there are disclosed biodegradable surface-active agents having good foam properties and foam stabilizing characteristics prepared by copolymerizing ethylene oxide alone or with another lower alkylene oxide and an alpha olefin oxide in the presence of a polyhydric alcohol. Molecular weights of 400 to 6000 are claimed but there is no indication that the compositions are useful as thickening agents for aqueous systems.

In U.S. Pat. No. 3,475,499, there is disclosed the preparation of glycols and glycol ethers by reacting with water 1,2-epoxides having 3 to 30 carbon atoms. The compositions are disclosed as useful in the preparation of detergents. High molecular weight polyether block polymers are disclosed in U.S. Pat. No. 3,535,307. Such compositions have molecular weights of about 2000 to about 25,000 and are useful in the preparation of polyurethanes.

SUMMARY OF THE INVENTION

Polyether-based thickeners are disclosed which comprise heteric, block, or homopolymer polyethers prepared by reacting ethylene oxide or ethylene oxide and at least one lower alkylene oxide having 3 to 4 carbon atoms in the presence of an active hydrogen-containing compound initiator and at least one alpha-olefin oxide having about 12 to about 18 carbon atoms. The alpha-olefin oxide can alternatively be reacted sequentially so as to cap the previously formed polymer. Improved thickening efficiency of said polyethers can be obtained by admixture with at least one of an ethoxylated phosphate ester or said phosphate ester and a water-soluble amine. The thickeners of the invention are particularly suited to use in aqueous hydraulic fluids where viscosity stability under high shear and elevated temperature conditions is desirable.

DETAILED DESCRIPTION OF THE INVENTION

Polyether thickening agents having greatly improved thickening efficiency over prior art high molecular weight polyethers based upon the reaction of ethylene oxide with an active hydrogen-containing initiator having at least 2 active hydrogens in combination with a lower alkylene oxide containing 3 to 4 carbon atoms can be prepared by modifying such conventional polyether thickening agents with an alpha-olefin oxide having about 12 to about 18 carbon atoms or mixtures thereof. Polyether compositions and processes are disclosed in co-pending application Ser. No. 86,840, filed on even date herewith, and now abandoned. Whether said alpha-olefin oxide is incorporated in the modified-polyether by copolymerization to produce a heteric polyether or by capping an ethylene oxide homopolymer or heteric or block polyethers, improved thickening efficiency without reduction in viscosity stability under high shear conditions can be obtained. Preferably, said heteric or block polyethers are capped with an alpha-olefin oxide. A further improvement in thickening efficiency can be obtained by combining the above-described alpha-olefin oxide-modified polyethers with at least one of an ethoxylated aliphatic phosphate ester or said ester and a water-soluble amine.

The preparation of polyethers is well known in the art. Generally, polyethers are prepared utilizing a lower alkylene oxide, an active hydrogen containing compound, and an acid or basic oxyalkylation catalyst in the presence of an inert organic solvent at elevated temperatures in the range of about 50° C. to 150° C. under an inert gas pressure generally from about 20 to about 100 lbs. per square inch gauge.

Any suitable prior art alkaline oxyalkylation catalyst can be used in the preparation of the polyethers used herein. These include, for example, strong bases, such as sodium hydroxide, sodium methylate, potassium hydroxide, and the like; salts of strong bases with weak acids, such as sodium acetate, sodium glycolate, and the like and quaternary ammonium compounds, such as benzyl dimethyl cetyl ammonium compounds and the like. The concentration of these catalysts in the reaction mixture is not critical and may vary from about 0.1 percent to 5 percent by weight of the initiator compound.

An inert organic solvent may be utilized in the above-described procedures. The amount of solvent used is that which is sufficient to provide a suitable reaction medium and is generally, on a molar basis, in excess of the total amount of the reactants. Examples of suitable solvents include aliphatic hydrocarbons, such as hexane, heptane, isoheptane; aromatic hydrocarbons, such as benzene, toluene, xylene; chlorinated hydrocarbons, such as carbon tetrachloride, ethylene dichloride, propylene dichloride; and oxygenated hydrocarbons, such as diethyl ether, dimethyl ether, anisole, and the like.

A useful copolymer polyether is prepared by mixing ethylene oxide and at least one lower alkylene oxide having 3 to 4 carbon atoms with a low molecular weight active hydrogen-containing compound initiator having 2 to 6 active hydrogen atoms such as a polyhydric alcohol, containing from 2 to 10 carbon atoms and from 2 to 6 hydroxyl groups and from about 5.0 mole to 15.0 moles of an alpha-olefin oxide per mole of alcohol, said oxide having from 12 to 18 carbon atoms; heating said mixture to a temperature in the range of about 50° C. to 150° C., preferably from 80° C. to 130° C., under an inert gas pressure preferably from about 30 p.s.i.g. to 90 p.s.i.g. A mixture of ethylene oxide and other alkylene oxides having from three to four carbon atoms is used in said mixture in an amount so that the resulting polyether product will contain at least 10 percent by weight, preferably about 70 to 99 percent by weight ethylene oxide. Said mixture is maintained at a temperature and pressure in said range for a period of about one hour to ten hours, preferably one to three hours. Alternatively, ethylene oxide homopolymers or block or heteric polymers of ethylene oxide and at least one lower alkylene oxide having 3 to 4 carbon atoms can be prepared as intermediates. These are then capped with said alpha-olefin oxide to prepare the thickeners of this invention. If desired, a catalyst can be added to the reaction mixture prior to the ethylene oxide addition. Alkaline catalysts such as potassium hydroxide or acid catalysts such as boron trifluoride are useful, as is well established in the art. The heteric copolymers can be liquids; the ethylene oxide homopolymers are solids; and the block copolymers are semi-solids at ambient temperatures.

As is well known in the art, polyethers are prepared utilizing an initiator compound which contains a reactive (or active) hydrogen atom. The term reactive hydrogen atom is well known and clearly understood by those skilled in the art. However, to remove any possible ambiguity in this regard, the term reactive hydrogen atom, as used herein and in the appended claims, includes any hydrogen atom fulfilling the following two conditions:

1. It is sufficiently labile to open the epoxide ring of 1,2-propylene oxide, and
2. It reacts with methyl magnesium iodide to liberate methane in the classical Zerewitinoff reaction (see Niederle and Niederle, Micromethods of Quantitative Organic Analysis, p. 263, John Wiley and Sons, New York City, 1946).

The reactive hydrogen atoms which will fulfill the above two conditions are normally activated by being a member of a functional group containing an oxygen atom, e.g., a hydroxyl group, a phenol group, a carboxylic acid group; a basic nitrogen atom, e.g., an amine group, a hydrazine group, an imine group, an amide group, a guanidine group, a sulfonamide group, a urea group, a thiourea group; or a sulfur atom, e.g., a mercaptan, a thiophenol, a thiocarboxylic acid, hydrogen sulfide. Alternatively, certain hydrogen atoms may be activated by proximity to carbonyl groups such as those found in cyanoacetic esters, acetoacetic esters, malonic esters, as is well known in the art. Generally, polyhydric alcohol initiators selected from the alkane polyols, alkene polyols, alkyne polyols, aromatic polyols, and oxyalkylene polyols are useful initiators. Specific examples of base compounds which may be used in preparing the polyoxy-alkylene polymers include ethylene glycol, 1,3-butylene glycol, oxalic acid, mono-, di-, and triethanolamine, butylamine aniline, resorcinol, diethylmalonate, glycerol, butane diol, exalic acid, diethylmaleate, pentaerythritol, sucrose, ethylene diamine, bisphenol A, hydroquinone, etc.

Of the alkane polyols such as ethylene glycol, propylene glycol, 1,4-butanediol, 1,2-butanediol, trimethylol propane, glycerol, 2,3,5,6-hexane tetrol, sorbitol, pentaerythritol, glucose and the like, polyhydric alcohols having about 2 to about 10 carbon atoms and from about 2 to about 6 hydroxy groups are preferred initiators. Alkene polyols having about 2 to about 10 carbons and from about 2 to about 6 hydroxyl groups are also useful such as 2-butene-1,4-diol, 2-hexene-1,4,6-triol, 3-heptene-1,2,6,7-tetrol, 1,5-hexadiene-3,4-diol and the like as well as the alkylene polyols such as 2-butyne-1,4-diol, 2-hexyne-1,4,6-triol, 4-octyne-1,2,7,8-tetrol and the like. The oxyalkylene polyols, such as diethylene glycol, triethylene glycol, tetraethylene glycol, dipropylene glycol, tripropylene glycol, and the like are also useful.

The heteric or block copolymers useful in the invention which are capped, i.e., copolymerized with an alpha-olefin oxide having about 12 to about 18 carbon atoms are mixtures with ethylene oxide of lower alkylene oxides having 3 to 4 carbon atoms. Generally, the proportion of ethylene oxide is at least about 10 percent by weight and preferably is about 70 to about 99 percent by weight of the mixture of ethylene oxide and the alkylene oxide having 3 to 4 carbon atoms. The lower alkylene oxides referred to are propylene oxide and the butylene oxides such as 1,2-butylene oxide and 2,3-butylene oxide and tetrahydrofuran. The proportion of lower alkylene oxides having 3 to 4 carbon atoms utilized in combination with ethylene oxide is generally less than 90 percent by weight of the mixed copolymer and preferably is 30 to 1 percent by weight thereof. Generally, useful polymers have a molecular weight of about 1000 to about 75,000, preferably about 1000 to about 40,000.

The alpha-olefin oxides which are utilized to modify the polyether polyols of the prior art are those oxides containing about 12 to about 18 carbon atoms and the commercially available mixtures thereof. The amount of alpha-olefin oxide required to obtain the more efficient polyether thickening agents of the invention is about 1 to about 20 percent by weight of the total weight of the polyether thickeners of the invention. This amount of alpha-olefin oxide based upon the molar amount of active hydrogen-containing initiator compound is about 5.0 mole to about 15.0 moles of alpha-olefin oxide per mole of di- or trifunctional active hydrogen-containing initiator. Preferably, the alpha-olefin oxide contains a mixture of 14 to 16 carbon atoms and linear alkyl chains. Examples of useful alpha-olefin oxides are those commercially available under the trademark VIKOLOX.

Since the preparation of heteric and block copolymers of alkylene oxides are well known in the art, further description of the preparation of heteric and block copolymers of mixed lower alkylene oxides is unnecessary. Further details of the preparation of heteric copolymers of lower alkylene oxide can be obtained in U.S. Pat. No. 3,829,506, incorporated herein by reference. Further information on the preparation of block copolymers of lower alkylene oxides can be obtained in U.S. Pat. No. 3,535,307, incorporated herein by reference.

Alternatively to the use of the above-described alpha-olefin oxides to modify high molecular weight polyethers, it is possible to substitute glycidyl ethers which can be prepared by reaction of an alcohol having 12 to about 18 carbon atoms with epichlorohydrin in accordance with the chlorohydrin in accordance with the teachings of U.S. Pat. No. 4,086,279 and references cited therein, all incorporated by reference.

The useful water-soluble amines which act synergistically in combination with the ethoxylated phosphate esters in providing increased thickening efficiency of the above-described polyethers modified with alpha-olefin oxides are the water-soluble aliphatic, aromatic and cyclo-aliphatic amines including alkanol amines. Representative examples include methylamine, dimethylamine, trimethylamine, ethylamine, diethylamine, triethylamine, n-propylamine, di-n-propylamine, tri-n-propylamine, isopropylamine, n-butylamine, isobutylamine, secondary butylamine, tertiary butylamine, cyclohexylamine, benzylamine, alpha-phenylethylamine, beta-phenylethylamine, ethylenediamine, tetramethylenediamine, hexamethylenediamine, tetramethylammonium hydroxide, morpholine, N-methyl morpholine, N-ethyl morpholine, dimethylaminopropylamine, N,N-dimethylethanolamine, alpha- and gammapicoline, piperazine, isopropylaminoethanol, N,N-dimethylcyclohexylamine, 2-amino-2-methyl-1-propanol.

The ethoxylated phosphate ester useful either alone or in combinations with the above-described water-soluble amines in providing increased efficiency of the above-described alpha-olefin epoxide-modified polyether polyol are those phosphate esters selected from the group consisting of:

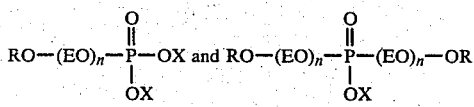

and mixtures thereof, wherein EO is ethylene oxide; R is selected from the group consisting of linear or branched chain aliphatic groups having about 6 to about 30 carbon atoms, preferably about 8 to about 20 carbon atoms, aryl or arylalkyl groups wherein the arylalkyl groups have about 6 to about 30 carbon atoms, preferably about 8 to about 18 carbon atoms, and X is selected from the group consisting of the residue of hydrogen, ammonia or an amine and an alkali or alkaline earth metal or mixtures thereof and n is a number from 1–50. Metals such as lithium, sodium, potassium, rubidium, cesium, calcium, strontium and barium are examples of X.

The phosphate ester compositions utilized in the compositions of the invention are more fully disclosed in U.S. Pat. Nos. 3,044,056 and 3,004,056.

In general, the phosphate esters employed are obtained by esterifying one mole of $P_2O_5$ with 2 to 4.5 moles of a nonionic surface active agent characterized as a condensation product of at least one mole of ethylene oxide with one mole of a compound having at least 6 carbon atoms and a reactive hydrogen atom. Such nonionic surface active agents are well known in the art and are generally prepared by condensing a polyglycol ether containing a suitable number of alkenoxy groups or a 1,2-alkylene oxide, or substituted alkylene oxide such as a substituted propylene oxide, butylene oxide or preferably ethylene oxide with an organic compound containing at least 6 carbon atoms and a reactive hydrogen atom. Examples of compounds containing a reactive hydrogen atom are alcohols, phenols, thiols, primary and secondary amines, and carboxylic and sulfonic acids and their amides. The amount of alkylene oxide or equivalent condensed with the reactive chain will depend primarily upon the particular compound with which it is condensed. Generally, an amount of alkylene oxide or equivalent should be employed which will result in a condensation product containing about 20 to 85 percent by weight of combined alkylene oxide. However, the optimum amount of alkylene oxide for attainment of the desired hydrophobic-hydrophilic balance may be readily determined in any particular case by preliminary test and routine experimentation.

The nonionic surface active agents used are preferably polyoxyalkylene derivatives of alkylated and polyalkylated phenols, multi-branched chain primary aliphatic alcohols having the molecular configuration of an alcohol produced by the oxo process from a polyolefin of at least 7 carbon atoms, and straight chain aliphatic alcohols of at least 10 carbon atoms. Examples of these derivatives and other suitable nonionic surface active agents which may be phosphated in accordance with the present invention are included below. In this list, "EO" means "ethylene oxide" and the number preceding same refers to the number of moles thereof reacted with one mole of the given reactive hydrogen containing compound.

Nonylphenol + 9 – EO
Nonylphenol + 2 EO
Dinonylphenol + 7 EO
Dodecylphenol + 18 EO
Castor oil + 20 EO
Tall oil + 18 EO
Oleyl alcohol + 4 EO
Oleyl alcohol + 20 EO
Lauryl alcohol + 4 EO
Lauryl alcohol + 15 EO
Hexadecyl alcohol + 12 EO
Hexadecyl alcohol + 20 EO
Octadecyl alcohol + 20 EO
Oxo tridecyl alcohol:
  (From tetrapropylene) + 7 EO
  (From tetrapropylene) + 10 EO
  (From tetrapropylene) + 15 EO
Dodecyl mercaptan + 9 EO
Soya bean oil amine + 10 EO
Rosin amine + 32 EO
Coconut fatty acid amine + 7 EO
Cocoa fatty acid + 10 EO
Dodecylbenzene sulfonamide + 10 EO Decyl sulfonamide + 6 EO
Oleic acid + 5 EO
Propylene glycol (30 oxypropylene units) + 10 EO Increased thickening efficiency of the alpha-olefin oxide modified polyether disclosed above is preferably obtained by utilizing the aromatic or aliphatic ethoxylated phosphate ester described above alone or in mixtures thereof with a water-soluble amine, as described above. Surprisingly, greatly improved thickening efficiency can be obtained utilizing relatively minor amounts of either said mixture or the phosphate ester alone. Generally, at least about 0.5 percent by weight of either of said phosphate ester or said mixture of phosphate ester and water-soluble amine are utilized to provide the improved thickening efficiency with the above-described alpha-olefin oxide-modified polyether. A mixture of about 20 to about 50 percent of said amine with about 80 to about 50 percent of said phosphate ester is generally used. Preferably, a mixture of about 30 to about 40 percent by weight of said amine and about 70 to about 60 percent by weight of said phosphate ester, all based upon the total weight of the mixture of the modified polyether and phosphate ester and amine additives, is used. About 10 to about 35 percent by weight based upon the total weight of said polyether-based thickener is used of said mixture of said phosphate ester and said water-soluble amine or said phosphate ester. An effective thickening proportion of polyether is utilized in thickening aqueous systems, generally obout 5 percent to about 50 percent by weight, preferably about 10 percent to about 20 percent by weight.

The following examples will illustrate the preparation of the alpha-olefin oxide-modified polyethes and mixtures thereof with the phosphate ester and amine additives of the invention. Where not otherwise specified throughout this specification and claims, temperatures are given in degrees centigrade and parts, percentages and proportions are by weight.

EXAMPLE 1

(Control or Comparative Example)

A conventional polyether derived from ethylene oxide and b 1,2-propylene oxide in the ratio of 75 percent ethylene oxide and 25 percent 1,2-propylene oxide was prepared by reaction with trimethylol propane in two stages in a stainless steel autoclave. An intermediate product was first prepared by reacting a mixture of trimethylol propane, potassium hydroxide, 1,2-propylene oxide, and ethylene oxide for a period of 18 hours at 120° C. The cooled liquid product was discharged into a glass container.

The final product was prepared by reacting this intermediate product with 1,2-propylene oxide and ethylene oxide under a nitrogen atmosphere at 115° C. for 22 hours. The reaction mixture was then cooled and the viscous liquid product transferred to a glass container. The product had a molecular weight of about 23,000.

EXAMPLE 2

Into a two-gallon stainless steel mixer there was charged 3400 grams of the copolymer prepared in Example 1. The contents of the mixer were blanketed with nitrogen and then heated by steam utilizing an external jacket on the mixer. There was then added 6.8 grams of sodium and the mixture was stirred while the reaction was allowed to continue. After 3.5 hours, 34 grams of a mixture of alpha-olefin oxides having an aliphatic chain length of 15 to 18 carbon atoms sold under the trademark VIKOLOX 15–18 by the Viking Chemical Company, was added at once. The stirring and heaating was continued for another 43 hours before the reaction mixture was cooled and the viscous product transferred to a glass container.

EXAMPLE 3

A liquid heteric copolymer of 80 percent by weight ethylene oxide, 15 percent by weight 1,2-propylene oxide and 5 percent by weight of an alpha-olefin oxide having an aliphatic carbon chain length of 15 to 18 carbon atoms sold under the trademark VIKOLOX 15–18 was prepared according to the following procedure.

A glass flask was charged with 1410 grams of the intermediate copolymer prepared in Example 3 and heated to 105° C. while under a nitrogen atmosphere. While stirring the contents of the flask, there was added 10.2 grams of sodium and the mixture reacted for a period of 24 hours. The intermediate product obtained was cooled to room temperature prior to further use. Thereafter a 250 milliliter centrifuge bottle was charged with 100 grams of the intermediate product prepared above together with 3.3 grams of propylene oxide and 19 grams of ethylene oxide. The contents of the bottle were mixed at room temperature and then the bottle was stopped with a Teflon covered rubber stopper and the bottle was placed in a steam bath for 24 hours. The second intermediate product was cooled to room temperature before further use. To the centrifuge bottle above containing the second intermediate product obtained above, there was added 2.5 grams of an alpha-olefin oxide having an aliphatic carbon chain length of 15 to 18 carbon atoms sold under the trademark VIKOLOX 15–18 together with 3.3 grams of propylene oxide and 19 grams of ethylene oxide. The contents were further mixed and stoppered and the bottle placed in a steam bath for 21 hours. The viscous product obtained was bottled for storage.

EXAMPLE 4

(Control or Comparative Example)

A thickened water solution containing 10 percent of the polyether of Example 1 in combination with 0.5 percent of ethanolamine and 1.0 percent of the ester of two moles of phosphorus pentoxide and one mole of the condensation product of one mole of oleyl alcohol and four moles of ethylene oxide were combined. The sample had a viscosity (SUS) at 100° F. of 55.

EXAMPLE 5

(Control or Comparative Example)

Utilizing the polyether of Example 3, a 5 percent aqueous solution was prepared. The viscosity was found to be 126 SUS at 100° F.

EXAMPLE 6

Utilizing the polyether of Example 3, a 5 percent solution in water was prepared containing 0.5 percent by weight of ethanolamine. The pH of the solution was found to be 9 and the viscosity was 120 SUS at 100° F.

EXAMPLE 7

Utilizing the polyether of Example 3, a 5 percent by weight aqueous solution was prepared containing 0.5 percent by weight ethanolamine and 1.0 percent by weight of the phosphate ester of Example 4. The pH was found to be 9 and the viscosity was 544 SUS at 100° F.

EXAMPLE 8

Utilizing the polyether of Example 3, a 5 percent by weight aqueous solution was prepared containing 0.5 percent by weight of ethanolamine and 1.0 percent by weight of the phosphate ester of Example 4. The pH was 9 and the viscosity was 2820 SUS at 100° F.

In the following table, the test results of Examples 1 and 3-10 are tabulated. These results indicate the unexpected synergistic thickening effects of amine and phosphate ester additives compared with polyether thickeners of the invention both unmodified and modified with alpha-olefin oxides.

TABLE

Synergistic Thickening of Aqueous Solutions

| Example | Polyether Concentration (% Wt.) | Additive (% Wt.) Amine[1] | Phosphate Ester[2] | pH | Viscosity (SUS) at 100° F. |
|---|---|---|---|---|---|
| 1 (control) | 10 | — | — | 7 | 53 |
| 4 (control) | 10 | 0.5 | 1.0 | 9 | 55 |
| 5 (control) | 5 | — | — | 7 | 126 |
| 6 | 5 | 0.5 | — | 9 | 120 |
| 7 | 5 | — | 1.0 | 3 | 544 |
| 8 | 5 | 0.5 | 1.0 | 9 | 2820 |

[1]ethanolamine
[2]ester of two moles of phosphorus pentoxide and one mole of the condensation product of one mole of oleyl alcohol and four moles of ethylene oxide While this invention has been described with reference to certain specific embodiments, it will be recognized by those skilled in the art that many variations are possible without departing from the spirit and scope of the invention and it will be understood that it is intended to cover all changes and modifications of the invention disclosed herein for the purposes of illustration which do not constitute departures from the spirit and scope of the invention.

We claim:

1. A polyether-based thickener for aqueous systems consisting essentially of in admixture:
    A. a polyether having a molecular weight of about 1000 to about 75,000 which is prepared by reacting (1) ethylene oxide or (2) ethylene oxicde and at least one lower alkylene oxide having 3 to 4 carbon atoms, with at least one active hydrogen-containing polyhydric alcohol initiator and at least one alpha-olefin oxide having a carbon chain length of about 12 to about 18 aliphatic carbon atoms and wherein said alpha-olefin oxide is present in the amount of about 1 to about 20 percent by weight based upon the total weight of said polyether and about 10 to about 35 percent by weight based upon the total weight of said polyether-based thickener of:
    B. a mixture of about 20 to about 50 percent of a water-soluble amine and about 80 to about 50 percent of an ethoxylated phosphate ester, or an ethoxylated phosphate ester, wherein said phosphate ester is selected from the group consisting of

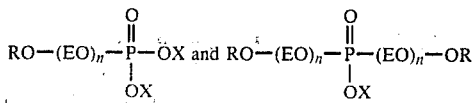

and mixtures thereof, wherein EO is ethylene oxide; R is selected from the group consisting of linear or branched chain aliphatic groups having about 6 to 30 carbon atoms, and aryl or alkylaryl groups wherein said arylalkyl groups have about 6 to 30 carbon atoms; X is selected from the group consisting of the residue of hydrogen, ammonia, an amine, an alkali or alkaline earth metal and mixtures thereof; and n ia a number from 1 to 50.

2. The thickener of claim 1 which is liquid at ambient temperature, wherein said polyether is prepared by copolymerizing a mixture of said reactants to produce a heteric copolymer and wherein said mixture (A and B) includes said water-soluble amine and said phosphate ester in said phosphate ester based upon the total weight of said amine and phosphate ester.

3. The thickener of claim 1 wherein said polyether is prepared by sequentially reacting ethylene oxide with at least one of said lower alkylene oxides to produce a block copolymer intermediate and subsequently reacting said intermediate with at least one of said alpha-olefin oxide.

4. The thickener of claim 1 which is liquid at ambient temperature, wherein said polyether is prepared by copolymerizing a mixture of ethylene oxide and at least one of said lower alkylene oxides to produce a heteric copolymer intermediate and subsequently reacting said intermediate with at least one of said alpha-olefin oxide.

5. The thickener of claim 4 wherein said lower alkylene oxide is selected from the group consisting of 1,2-propylene oxide, 1,2-butylene oxide, 1,3-butylene oxide, 1,4-butylene oxide, 2,3-butylene oxide and tetrahydrofuran and wherein the proportion of ethylene oxide in said polyether is at least 10 percent by weight of the total weight of said thickener.

6. The thickener of claim 5 wherein the proportion of ethylene oxide to said lower alkylene oxides is from about 70 to about 99 percent by weight of ethylene oxide to about 30 to about 1 percent by weight of the said lower alkylene oxides and said active hydrogen containing compound is a polyhydric alcohol having from 2 to 10 carbon atoms and from 2 to 6 hydroxyl groups.

7. The thickener of claim 6 wherein said polyhydric alcohol initiator is selected from the group consisting of alkane polyols, alkene polyols, alkyne polyols, aromatic polyols, and oxyalkylene polyols.

8. The thickener of claim 7 wherein said alkane polyol initiators are selected from the group consisting of at least one of trimethylolpropane, glycerol, 2,3,5,6-hexanetetrol, sorbitol, and pentaerythritol and the molar ratio of said initiator to the molar ratio of said alpha-olefin oxide is in a mole ratio of about 1:5 to about 1:15 and wherein said phosphate ester is the ester of two moles of phosphorus pentoxide and one mole of the condensation product of one mole of oleyl alcohol and 4 moles of ethylene oxide.

9. A composition comprising water and an effective thickening amount of the polyether-based thickener of claim 1.

10. The composition of claim 9 additionally containing ethylene glycol.

11. The composition of claim 10 wherein said polyether is a liquid and is prepared by the heteric polymerization of a mixture of ethylene oxide and propylene oxide with trimethylolpropane as initiator to produce an intermediate heteric copolymer which is subsequently capped with said alpha-olefin oxide to produce a polyether having a molecular weight of about 1000 to 40,000 and wherein said amine is ethanolamine and said phosphate ester is the ester of two moles of phosphorus pentoxide and one mole of the condensation product of one mole of oleyl alcohol and four moles of ethylene oxide.

12. The process of thickening aqueous systems comprising the addition of an effective thickening amount of a polyether-based thickening agent to said aqueous system, said polyether-based thickener consisting essentially of in admixture:

A. a polyether having a molecular weight of about 1000 to about 75,000 which is prepared by reacting (1) ethylene oxide or (2) ethylene oxide and at least one lower alkylene oxide having 3 to 4 carbon atoms, with at least one active hydrogen-containing polyhydric alcohol initiator and at least one alpha-olefin oxide having a carbon chain length of about 12 to about 18 carbon atoms and wherein said alpha-olefin oxide is present in the amount of about 1 to about 20 percent by weight based upon the total weight of said polyether and about 10 to about 35 percent by weight based upon the total weight of said polyether-based thickener of:

B. a mixture of about 20 to about 50 percent of a water-soluble amine and about 80 to about 50 percent of an ethoxylated phosphate ester, or an ethoxylated phosphate ester, wherein said phosphate ester is selected from the group consisting of

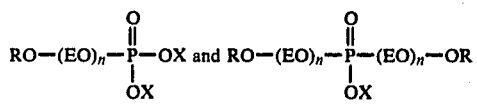

and mixtures thereof, wherein EO is ethylene oxide; R is selected from the group consisting of linear or branched chain aliphatic groups having about 6 to 30 carbon atoms, and aryl or alkylaryl groups wherein said arylalkyl groups have about 6 to 30 carbon atoms; X is selected from the group consisting of the residue of hydrogen, ammonia, an amine, an alkali or alkaline earth metal and mixtures thereof; and n is a number from 1 to 50.

13. The process of claim 12 wherein said polyether is prepared by polymerizing a mixture of ethylene oxide and at least one of said lower alkylene oxides to prepare a liquid heteric copolymer intermediate which is subsequently capped with said alpha-olefin oxide.

14. The process of claim 12 wherein said polyether thickening agent is the reaction product of the sequential polymerization of ethylene oxide and at least one of said lower alkylene oxides to prepare an intermediate which is subsequently capped with said alpha-olefin oxide.

15. The process of claim 12 wherein said polyether is a liquid heteric copolymer prepared by copolymerizing a mixture of said ethylene oxide with at least one of said lower alkylene oxides, at least one active hydrogen containing polyhydric alcohol, and at least one of said alpha-olefin oxide and wherein said phosphate ester is the ester of two moles of phosphorus pentoxide and one mole of the condensation product of one mole of oleyl alcohol and four moles of ethylene oxide.

16. The process of claim 15 wherein said ethylene oxide is present in said polyether in an amount of at least 10 percent by weight of the weight of said polyether and said lower alkylene oxide is selected from the group consisting of propylene oxide, the butylene oxides, tetrahydrofuran and mixtures thereof.

17. The process of claim 16 wherein the proportion of said ethylene oxide to said lower alkylene oxide in said polyether is in the amount of about 70 to about 99 percent by weight, said lower alkylene oxide is present in the amount of about 30 to about 1 percent by weight and said active hydrogen containing compound is a polyhydric alcohol having from 2 to 10 carbon atoms and from 2 to 6 hydroxyl groups.

18. The process of claim 17 wherein said polyhydric alcohol initiator is selected from the group consisting of alkane polyols, alkene polyols, alkyne polyols, aromatic polyols, and oxyalkylene polyols.

19. The process of claim 18 wherein said initiator is an alkane polyol selected from the group consisting of trimethylolpropane, glycerol, 2,3,5,6-hexanetetrol, sorbitol, and pentaerythritol and wherein said phosphate ester is the ester of two moles of phosphorus pentoxide and one mole of the condensation product of one mole of oleyl alcohol and four moles of ethylene oxide.

20. The process of claim 19 wherein the ratio of said initiator to said alpha-olefin oxide is 1:5 to 1:15 on a molar basis.

21. The process of claim 20 wherein said aqueous system comprises water or a mixture of water and ethylene glycol.

* * * * *